June 10, 1930. L. E. LA BRIE 1,762,691
BRAKE
Filed Sept. 1, 1928
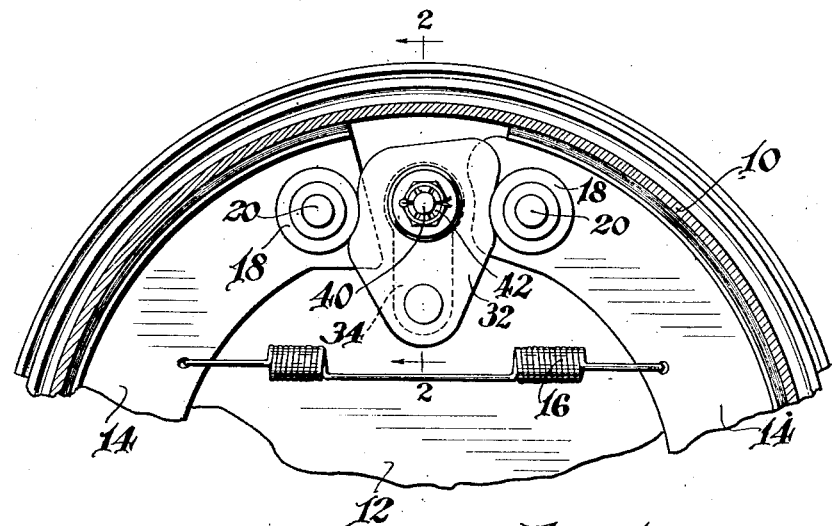
Fig. 1
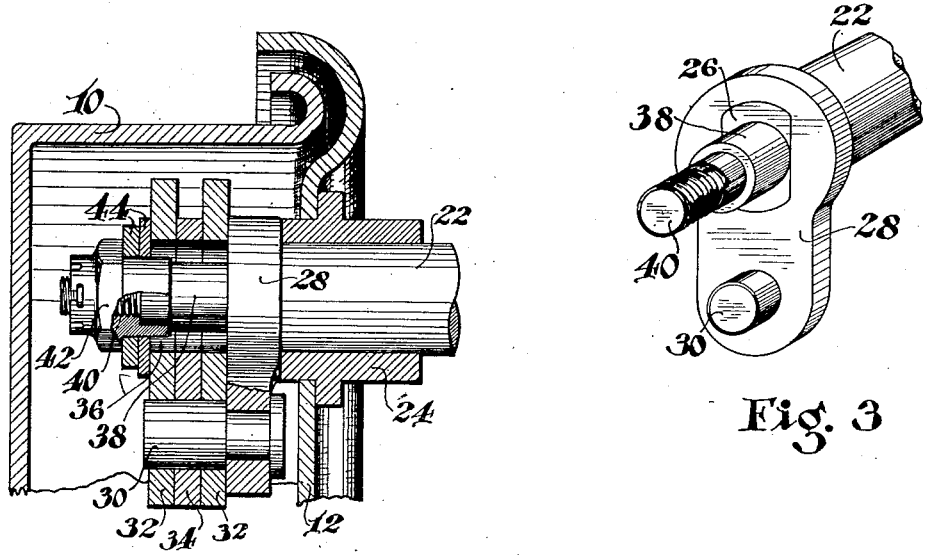
Fig. 2
Fig. 3
INVENTOR.
Ludger E. LaBrie
BY
M. W. McConkey
ATTORNEY.

Patented June 10, 1930

1,762,691

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed September 1, 1928. Serial No. 303,451.

This invention relates to brakes and is illustrated as embodied in novel operating mechanism for an internal expanding automobile brake. An object of the invention is to provide a simple operating device including a part which can shift to center itself with respect to the brake shoes or their equivalents, but which is clamped, preferably frictionally, so that after once finding its centered position it will not shift further unless the brakes wear unevenly.

In one desirable arrangement the device includes a cam-lever part which is pivotally connected to the end of an operating lever and which is shown as being frictionally clamped against the face of the operating lever to resist relative movement with respect thereto, but which can shift if necessary to center itself. I prefer to provide an axial extension of the shaft for the operating lever projecting through an opening in the frictionally gripped cam lever and which carries the friction gripping means.

I also consider it desirable to arrange the above-described cam lever to embrace the adjacent ends of the brake shoes or their equivalents to hold them against lateral movement.

The above and other objects and features of the invention, including various novel and desirable details of construction, will be apparent from the following description of one illustrative embodiment shown in the accompanying drawing, in which:

Figure 1 is a vertical section through the upper part of the brake just inside the head of the brake drum, and showing the ends of the brake shoes in side elevation;

Figure 2 is a partial radial section through the brake on the line 2—2 of Figure 1 and showing the novel operating mechanism in vertical section; and Figure 3 is a perspective view of the operating shaft and operating lever mounted thereon.

The novel operating mechanism is shown as embodied in a brake having a rotatable drum 10, at the open side of which is arranged a support such as the usual backing plate 12 and within which is arranged the friction means of the brake which, in the illustrative embodiment, includes shoes 14 which are forced apart against the drum in applying the brake against the resistance of the usual return spring 16. The shoes 14 are illustrated as provided at their ends with pairs of anti-friction rollers 18 on opposite sides of the shoe webs and which are pivotally mounted on pivot pins 20 extending through the shoe webs.

The brake is applied by means such as a shaft 22 journaled in a bearing 24 secured in any desired manner to the backing plate 12 and which is formed with a non-circular portion 26 on which is pressed an operating lever 28 having an opening of corresponding shape. At its lower end the lever 28 is provided with a laterally projecting stud or pin 30 serving as a pivot to connect the operating lever to a novel floating lever which may be built up of three laminations, the two outer laminations being cams 32 embracing the shoe ends between them and engaging the thrust rollers 18, and which are separated by a spacer 34 sufficiently narrow in width not to be engaged by the ends of the shoe webs. Preferably the three laminations 32 and 34 are formed as steel stampings and are spot-welded or otherwise permanently secured together.

At their upper ends the laminations 32 and 34 are formed with aligned openings 36 through which projects an axial extension 38 of the shaft 22. The extension 38 carries a threaded stud 40, which may be formed integrally with respect to the shaft or which may be a separate part threaded into the end of the shaft, and on which is threaded a castellated shouldered nut 42 on which are mounted washers 44 engaging the outer face of the outer cam lamination 32 and which are drawn up by the tightening of the nut 42 into frictional engagement with the outer cam lamination 32. It will be seen that this grips the novel floating laminated cam lever 32—34 between the outer face of the operating lever 28 and the above-described washers 44. Thus when the brake is applied the brake-applying pressure is sufficient to cause the novel laminated cam lever to shift to center itself if necessary, but when the brake is released the friction will hold the parts in their centered position so that they will not shift again unless the brake wears unevenly.

While one illustrative embodiment has been described in detail, it is not my intention to limit the scope of the invention to that particular embodiment or otherwise than by the terms of the appended claims.

I claim:

1. Operating mechanism comprising a shaft having a laterally extending operating lever with an applying lever pivotally connected thereto at one side of the shaft and extending across the axis of the shaft and which is frictionally held for movement with the operating lever in a manner permitting it to shift slightly with respect to the operating lever to center itself.

2. Operating mechanism comprising, in combination, an operating shaft having a laterally extending operating lever intermediate its ends, an applying lever pivotally connected to the operating lever at one side of the shaft and formed with a relatively large opening through which the end of the shaft projects, and means carried by the end of the shaft for frictionally holding the applying lever and resisting movement of the applying lever with respect to the operating lever.

3. Operating mechanism comprising, in combination, an operating shaft having a laterally extending operating lever intermediate its ends, an applying lever pivotally connected to the operating lever at one side of the shaft and formed with a relatively large opening through which the end of the shaft projects, and a nut threaded on the end of the shaft and having parts frictionally held against the outer face of the applying lever.

4. An operating mechanism comprising, in combination, a shaft having a non-circular portion and an axially extending part beyond the non-circular portion, a separately formed operating lever seated on said non-circular portion and extending laterally of the shaft, a shiftable applying lever pivotally connected to the operating lever at one side of the shaft and formed with an opening through which an axially extending portion projects, and means on the end of the axially extending portion of the shaft and frictionally engaging the applying lever.

5. An operating mechanism comprising, in combination, a shaft having a non-circular portion and an axially extending part beyond the non-circular portion, a separately formed operating lever seated on said non-circular portion and extending laterally of the shaft, a shiftable applying lever pivotally connected to the applying lever at one side of the shaft and formed with an opening through which the axially extending portion projects, and a nut threaded on the end of the axially extending portion of the shaft.

In testimony whereof, I have hereunto signed my name.

LUDGER E. LA BRIE.